US012643372B2

(12) United States Patent
Hadano et al.

(10) Patent No.: US 12,643,372 B2
(45) Date of Patent: Jun. 2, 2026

(54) INFORMATION PROCESSING METHOD, INFORMATION PROCESSING SYSTEM, INFORMATION PROCESSING DEVICE, AND PROGRAM

(71) Applicant: TOYOTA JIDOSHA KABUSHIKI KAISHA, Toyota (JP)

(72) Inventors: Hiroyasu Hadano, Toyota (JP);
Takaaki Inokuchi, Nagoya (JP);
Kunihiro Murakami, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 296 days.

(21) Appl. No.: 17/551,479

(22) Filed: Dec. 15, 2021

(65) Prior Publication Data

US 2022/0234421 A1 Jul. 28, 2022

(30) Foreign Application Priority Data

Jan. 22, 2021 (JP) ................................. 2021-009073

(51) Int. Cl.
*B60H 1/00* (2006.01)
*G06F 3/04847* (2022.01)
(52) U.S. Cl.
CPC ..... *B60H 1/00985* (2013.01); *B60H 1/00657* (2013.01); *B60H 1/00878* (2013.01); *G06F 3/04847* (2013.01)
(58) Field of Classification Search
CPC ............ B60H 1/00985; B60H 1/00657; B60H 1/00878; B60H 1/00778; G06F 3/04847; H04L 67/125
See application file for complete search history.

(56) References Cited

U.S. PATENT DOCUMENTS 7,028,912 B1 * 4/2006 Rosen ................ G05D 23/1905
236/94
2004/0122564 A1 * 6/2004 Ogasawara ............ G01C 21/26
701/1
(Continued)

FOREIGN PATENT DOCUMENTS

CN 107786612 A 3/2018
CN 108944339 A 12/2018
(Continued)

OTHER PUBLICATIONS

United States Office Action dated Oct. 1, 2025 in U.S. Appl. No. 18/919,776.
(Continued)

*Primary Examiner* — Kenneth J Malkowski
*Assistant Examiner* — Ibrahim Abdoalatif Alsomairy
(74) *Attorney, Agent, or Firm* — Sughrue Mion, PLLC

(57) ABSTRACT

An information processing method executed by a vehicle system that controls an air conditioner of a vehicle via a communication line includes: an output step of outputting a user interface corresponding to a type of the air conditioner provided in a target vehicle; an acquisition step of acquiring a parameter related to air conditioning, the parameter being set via the user interface; and control step of issuing a control command for controlling the air conditioner of the target vehicle based on the acquired parameter.

20 Claims, 7 Drawing Sheets

(56)                    References Cited

U.S. PATENT DOCUMENTS

| | | | |
|---|---|---|---|
| 2008/0183334 A1* | 7/2008 | Greiner | B60H 1/00964 |
| | | | 454/75 |
| 2015/0112489 A1* | 4/2015 | Sugiyama | H04L 67/10 |
| | | | 700/278 |
| 2015/0210287 A1* | 7/2015 | Penilla | B60N 2/0024 |
| | | | 701/49 |
| 2018/0147913 A1 | 5/2018 | Bergin | |
| 2018/0222282 A1* | 8/2018 | Tamane | B60H 1/00792 |
| 2022/0351006 A1* | 11/2022 | Price | G06F 16/24578 |

FOREIGN PATENT DOCUMENTS

| | | |
|---|---|---|
| JP | 2015-108500 A | 6/2015 |
| JP | 2018-122836 A | 8/2018 |

OTHER PUBLICATIONS

Communication dated Apr. 7, 2026, issued in U.S. Appl. No. 18/919,776.

* cited by examiner

FIG. 1

| VEHICLE ID | AIR CONDITIONING MODE | TEMPERATURE SETTING | TIMER | DEFROSTING | ... |
|---|---|---|---|---|---|
| V001 | HEATING | 26.5°C | 10 MINUTES | ON | ... |

USER INTERFACE SCREEN USED FOR
TYPE 1 AIR CONDITIONER

USER INTERFACE SCREEN USED FOR
TYPE 2 AIR CONDITIONER

601

C        H

| OPERATING TIME | 10 MINUTES |
| DEFROSTING OF WINDSHIELD | ON [OFF] |
| SEAT HEATER | ON [OFF] |
| STEERING WHEEL HEATER | ON [OFF] |

| VEHICLE ID | AIR CONDITIONING MODE | TEMPERATURE SETTING | TIMER | DEFROSTING | ... |
|---|---|---|---|---|---|
| V001 | HEATING | 4 | 10 MINUTES | ON | ... |

VEHICLE DATA

| VEHICLE ID | TYPE OF AIR CONDITIONER |
|---|---|
| V001 | 1 |
| V002 | 2 |

FIG. 9A

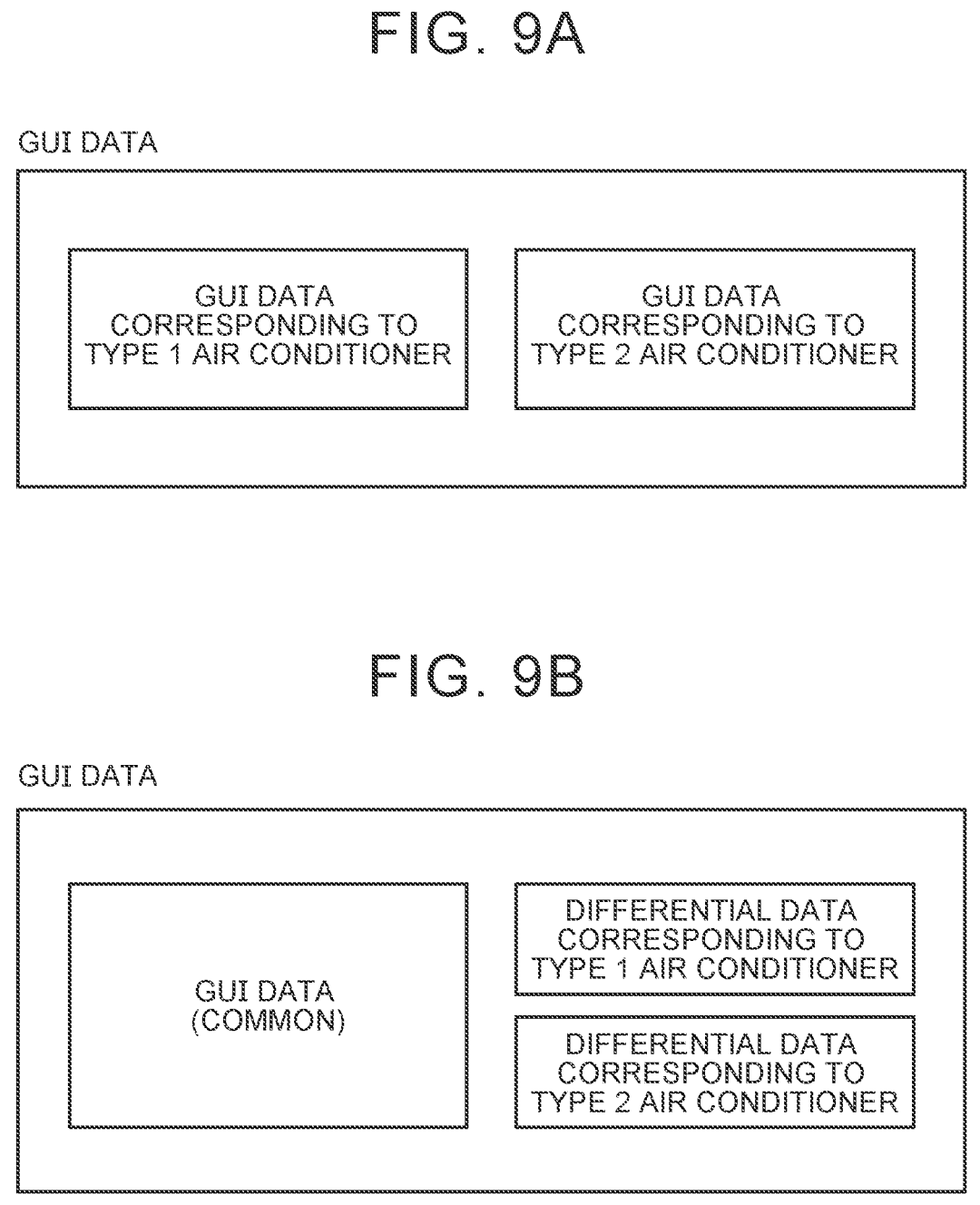

GUI DATA

GUI DATA
CORRESPONDING TO
TYPE 1 AIR CONDITIONER

GUI DATA
CORRESPONDING TO
TYPE 2 AIR CONDITIONER

FIG. 9B

GUI DATA

GUI DATA
(COMMON)

DIFFERENTIAL DATA
CORRESPONDING TO
TYPE 1 AIR CONDITIONER

DIFFERENTIAL DATA
CORRESPONDING TO
TYPE 2 AIR CONDITIONER

INFORMATION PROCESSING METHOD, INFORMATION PROCESSING SYSTEM, INFORMATION PROCESSING DEVICE, AND PROGRAM

CROSS-REFERENCE TO RELATED APPLICATION

This application claims priority to Japanese Patent Application No. 2021-009073 filed on Jan. 22, 2021, incorporated herein by reference in its entirety.

BACKGROUND

1. Technical Field

The present disclosure relates to air conditioning control of a vehicle.

2. Description of Related Art

There is a system for remotely controlling an air conditioning of a vehicle (car air conditioning). For example, Japanese Unexamined Patent Application Publication No. 2018-122836 (JP 2018-122836 A) discloses a remote air conditioning system that starts air conditioning of a vehicle based on a start request transmitted from a terminal and stops air conditioning when the temperature reaches a predetermined temperature.

SUMMARY

An object of the present disclosure is to improve the convenience of remote air conditioning.

A first aspect of the present disclosure is an information processing method executed by a vehicle system that controls an air conditioner of a vehicle via a communication line. Specifically, the information processing method includes: an output step of outputting a user interface corresponding to a type of the air conditioner provided in a target vehicle; an acquisition step of acquiring a parameter related to air conditioning, the parameter being set via the user interface; and a control step of issuing a control command for controlling the air conditioner of the target vehicle based on the acquired parameter.

A second aspect of the present disclosure is an information processing system that controls an air conditioner of a vehicle via a communication line. Specifically, the information processing system includes: a first device that outputs a user interface corresponding to a type of the air conditioner provided in a target vehicle and acquires a parameter related to air conditioning set via the user interface; and a second device that issues a control command for controlling the air conditioner of the target vehicle based on the acquired parameter.

A third aspect of the present disclosure is an information processing device that requests control of an air conditioner of a vehicle via a communication line. Specifically, the information processing device includes a control unit that executes: output of a user interface corresponding to a type of the air conditioner provided in a target vehicle; acquisition of a parameter related to air conditioning, the parameter being set via the user interface; and transmission of the acquired parameter to a server device that manages the target vehicle.

A fourth aspect of the present disclosure is an information processing method executed by an information processing device that requests control of an air conditioner of a vehicle via a communication line. Specifically, the information processing method includes: a step of outputting a user interface corresponding to a type of the air conditioner provided in a target vehicle; a step of acquiring a parameter related to air conditioning, the parameter being set via the user interface; and a step of transmitting the acquired parameter to a server device that manages the target vehicle.

Further, another aspect provides a program for causing a computer to execute the above information processing method, or a computer-readable storage medium in which the program is non-transitorily stored.

According to the present disclosure, the convenience of remote air conditioning can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a system configuration diagram of a vehicle system according to an embodiment;

FIG. 9A is an example of graphical user interface (GUI) data stored in the user terminal;

FIG. 9B is an example of the GUI data stored in the user terminal;

DETAILED DESCRIPTION OF EMBODIMENTS

Figure 2:
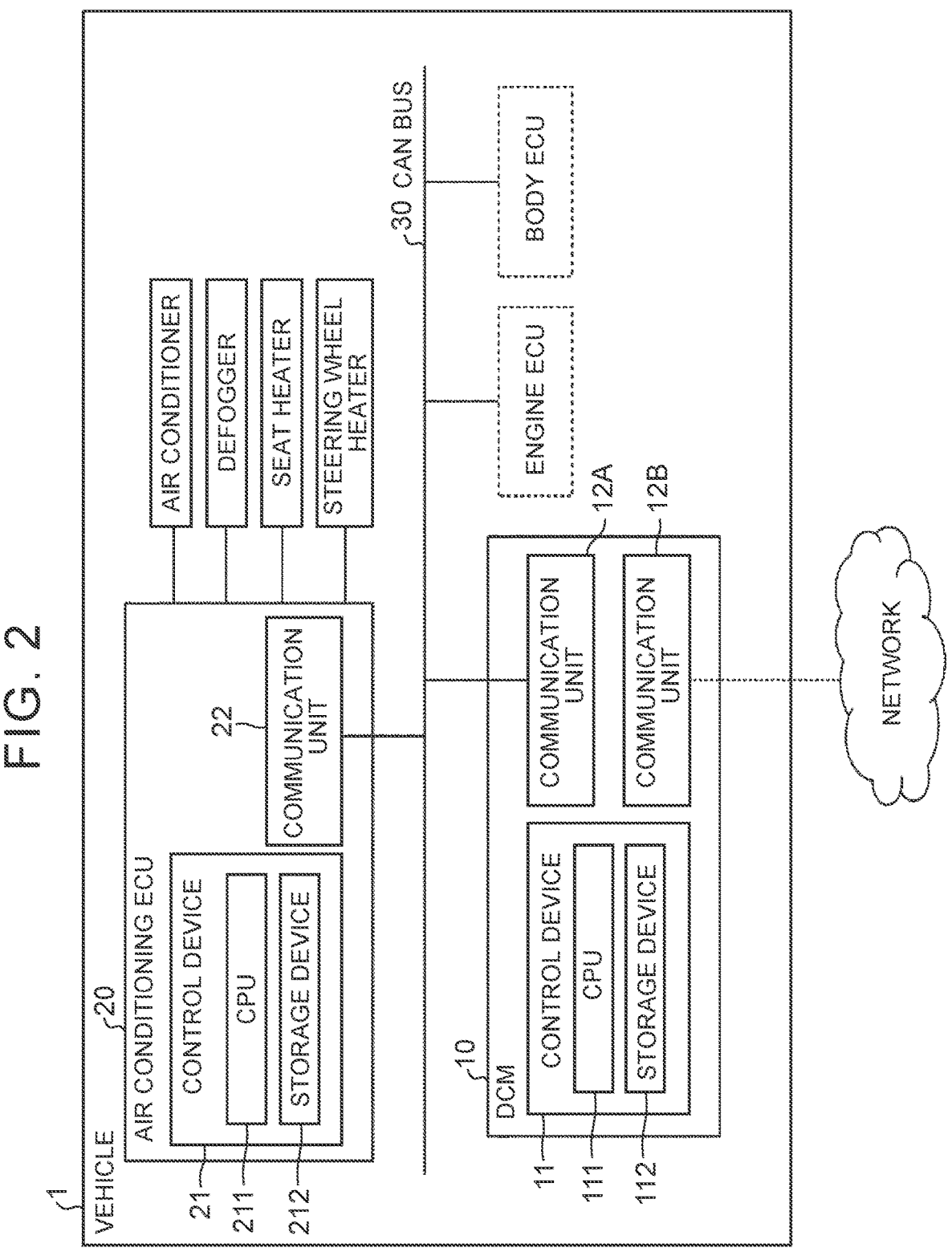
FIG. 2 is a block diagram showing components included in a vehicle.

An aspect of the present disclosure is an information processing method executed by a vehicle system that controls an air conditioner of a vehicle via a communication line. Specifically, the information processing method includes: an output step of outputting a user interface corresponding to a type of the air conditioner provided in a target vehicle; an acquisition step of acquiring a parameter related to air conditioning, the parameter being set via the user interface; and control step of issuing a control command for controlling the air conditioner of the target vehicle based on the acquired parameter.

When the air conditioning of the vehicle is externally controlled, it is necessary to specify the temperature and operating time of the air conditioning, the device to be operated, and the like. For example, there is known a technique of generating the parameter (hereinafter referred to as an air conditioning parameter) using application software running on a mobile terminal and transmitting the parameter to the vehicle.

However, there are various types of air conditioners mounted on the vehicles, and there are cases where the air conditioning parameter cannot be properly specified with a single user interface. For example, when a car air conditioner having a room temperature feedback function is operated, it is necessary to specify a desired room temperature numerically. On the other hand, when a car air conditioner that does not have a room temperature feedback function is operated, it may be necessary to specify the cooling and heating level, instead of the numerical value. As described above, the contents of the air conditioning parameter may differ depending on the type of the air conditioner. Therefore, the air conditioners of a plurality of vehicle types are controlled with a single user interface, there may be inconveniences such as the vehicles of some vehicle types that cannot be controlled.

In order to handle the issue above, in the information processing method according to the present disclosure, a user interface corresponding to the type of air conditioner provided in the target vehicle is output, and the air conditioning parameter is acquired using the user interface. The user interface may be output by a server device constituting the system, or may be output by a mobile terminal or the like possessed by a user of the vehicle. Providing a different user interface for each type of air conditioner provided in the vehicle makes it possible to control the air conditioners of the plurality of vehicle types with a single application.

Further, the air conditioner provided in the target vehicle may be at least one of a first type air conditioner in which a target room temperature is settable and a second type air conditioner in which the target room temperature is not settable.

In the first type air conditioner, it is necessary to specify the target room temperature numerically. However, in the second type air conditioner, numerical specification is not necessary. Therefore, it is preferable to use different user interfaces.

Further, in the output step, the user interface to be used may be selected from a plurality of the user interfaces that are stored, based on the type of the air conditioner provided in the target vehicle specified by a user.

For example, the vehicle (model name) and the type of the air conditioner, the type of the air conditioner and the user interface to be used may be associated with each other and stored, and an appropriate one may be selected.

Further, when the target vehicle specified by a user includes the first type air conditioner, a first user interface provided with a numerical display of the target room temperature may be provided, and when the target vehicle includes the second type air conditioner, a second user interface in which the numerical display of the target room temperature is omitted from the first user interface may be output.

Further, the user interface may include a slider for setting a temperature.

According to such a configuration, it is possible to control the air conditioners of the plurality of vehicle types using the user interfaces having the same appearance.

Another aspect of the present disclosure is a vehicle system that executes the information processing method described above. Each step may be executed by a plurality of devices (a server device, a mobile terminal, etc.) included in the vehicle system.

Hereinafter, embodiments of the present disclosure will be described with reference to the drawings. The configurations of the following embodiments are illustrative, and the present disclosure is not limited to the configurations of the embodiments.

First Embodiment

Figure 1:
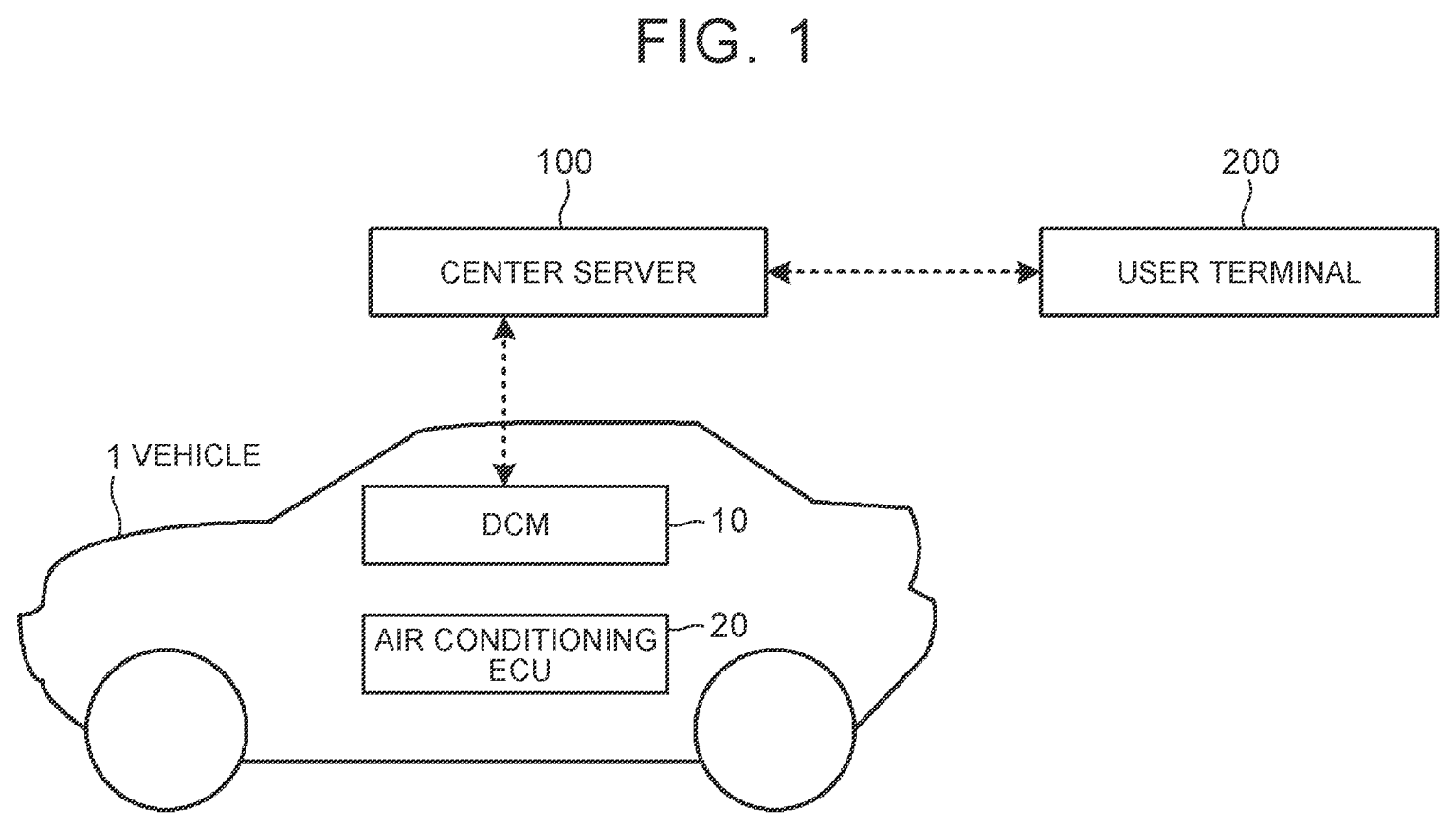

An outline of a vehicle system according to a first embodiment will be described with reference to FIG. 1. The vehicle system according to the present embodiment includes a vehicle 1, a center server 100, and a user terminal 200.

The vehicle 1 is a connected car provided with a communication function. The vehicle 1 includes a data communication module (DCM) 10 that is a communication module and an air conditioning electronic control unit (ECU) 20 that is an in-vehicle computer managing an air conditioner. The vehicle 1 can operate air conditioning (air conditioner, heater, etc.) based on the data received from the center server 100. Operating the air conditioning in advance before a user boards the vehicle is called "remote air conditioning".

The center server 100 is a server device that manages the vehicle 1. The center server 100 may manage a plurality of the vehicles 1. The center server 100 commands the vehicle 1 to operate the remote air conditioning based on a request transmitted from the user terminal 200.

The user terminal 200 is a mobile terminal owned by the user of the vehicle 1. The user terminal 200 is configured to be able to execute an application program for performing remote air conditioning of the vehicle. The user terminal 200 generates a request for operating the air conditioning of the vehicle 1 (hereinafter referred to as an air conditioning request) based on the content of an input made by the user on the application program, and transmits the request to the center server 100.

Next, components of the system will be described in detail. FIG. 2 is a block diagram schematically showing an example of the configuration of the vehicle 1 shown in FIG. 1. The vehicle 1 includes the DCM 10 and the air conditioning ECU 20. These components are connected to each other by a controller area network (CAN) bus 30. Note that, in the present embodiment, the air conditioning ECU is exemplified as an ECU mounted on the vehicle 1. However, the vehicle 1 may be equipped with a plurality of other ECUs having jurisdiction over other components than air conditioning, such as an engine ECU and a body ECU.

The DCM 10 is an interface unit that connects an in-vehicle network and an external communication network of the vehicle 1. Hereinafter, the external communication network of the vehicle 1 is simply referred to as a network or an external network. Examples of the external network include a wide area network such as the Internet. The DCM 10 includes a control device 11 that is a microcomputer, a communication unit 12A that is an interface for communicating with the CAN bus 30, and a communication unit 12B that is an interface for communicating with an external network.

The control device 11 can be configured as a microcomputer provided with a processor such as a central processing unit (CPU) or a graphics processing unit (GPU), a main storage device such as a random access memory (RAM) or a read-only memory (ROM), and an auxiliary storage device such as an erasable programmable read-only memory (EPROM), a disk drive, or a removable media. However, some or all of the functions may be implemented by a hardware circuit such as an application specific integrated circuit (ASIC) or a field programmable gate array (FPGA).

In the present embodiment, the control device 11 includes a CPU 111 and a storage device 112. The CPU 111 is an arithmetic unit that realizes various functions of the DCM 10 by executing a predetermined program. The storage device 112 is a memory device including a main storage device and an auxiliary storage device. An operating system (OS), various programs, various tables, and the like are stored in the auxiliary storage device. The programs stored in the auxiliary storage device are loaded into the work area of the main storage device and executed, and through this execution, various functions can be implemented that match the predetermined purpose, which will be described later.

The control device 11 included in the DCM 10 has a function of mediating communication between the external network and the vehicle 1. For example, when the ECU of the vehicle 1 requires communication with the external network, the DCM 10 relays the data transmitted from the ECU to the external network. In addition, the DCM 10 receives the data transmitted from the external network and transfers the data to an appropriate ECU. In the present embodiment, the control device 11 receives a command for operating the air conditioning of the vehicle 1 (hereinafter referred to as an air conditioning command) from the center server 100, and executes a process of transferring the air conditioning command to the air conditioning ECU 20 that will be described later.

In addition, the DCM 10 can execute functions specific to its own device. For example, the DCM 10 has a security system monitoring function and a call function, and can make a security call, an emergency call, or the like based on a trigger generated in the vehicle.

The communication unit 12A is a communication interface that connects the DCM 10 to the in-vehicle network (CAN bus 30). The communication unit 12A executes a process of converting a message in a predetermined format generated by the control device 11 into CAN data and a process of converting the received CAN data into a message in a predetermined format and transmitting the message to the control device 11. The communication unit 12B is a communication interface that connects the DCM 10 to the external network. The communication unit 12B executes a process of converting a message in a predetermined format generated by the control device 11 into a communication packet and a process of converting the received communication packet into a message in a predetermined format and transmitting the message to the control device 11.

Next, the air conditioning ECU 20 will be described. The air conditioning ECU 20 is an electronic control unit that controls the air conditioning of the vehicle 1. A plurality of air conditioning devices included in the vehicle 1 are connected to the air conditioning ECU 20, and the air conditioning devices can be controlled based on a command from the user. Examples of the air conditioning devices provided in the vehicle 1 include an air conditioner, a defogger, a seat heater, and a steering wheel heater. The air conditioning ECU 20 can operate the air conditioning device based on both the operation performed on a control panel installed in the vehicle and the air-conditioning command transmitted from the external network.

The air conditioning ECU 20 includes a control device 21 that is a microcomputer and a communication unit 22 that is an interface communicating with the CAN bus 30.

That is, similar to the control device 11, the control device 21 can be configured as a microcomputer provided with a processor such as a CPU or a GPU, a main storage device such as a RAM or a ROM, an auxiliary storage device such as an EPROM, a hard disk drive, or a removable medium.

In the present embodiment, the control device 21 includes a CPU 211 and a storage device 212. The CPU 211 is an arithmetic unit that realizes various functions of the air conditioning ECU 20 by executing a predetermined program. The storage device 212 is a memory device including a main storage device and an auxiliary storage device. The functions are the same as those of the CPU 111 and the storage device 112. Therefore, detailed description thereof will be omitted.

The control device 21 included in the air conditioning ECU 20 receives an air conditioning command for operating air conditioning of the vehicle 1 from the external network, and operates one of the air conditioning devices based on the air conditioning command.

The communication unit 22 is a communication interface that connects the air conditioning ECU 20 to the in-vehicle network (CAN bus 30). The communication unit 22 executes a process of converting a message in a predetermined format generated by the control device 21 into CAN data and a process of converting the received CAN data into a message in a predetermined format and transmitting the message to the control device 21.

The CAN bus 30 is a communication bus that constitutes the in-vehicle network based on the CAN protocol. In the present embodiment, one CAN bus 30 is exemplified. However, the in-vehicle network may include a plurality of communication buses. Further, the in-vehicle network may include a gateway that connects the communication buses to each other.

Next, the center server 100 and the user terminal 200 will be described. The center server 100 is a server device that manages a plurality of the vehicles 1. The center server 100 can transmit and receive data to and from the vehicles 1 by wireless communication. In the present embodiment, the center server 100 commands the vehicle 1 to operate the remote air conditioning based on the air conditioning request transmitted from the user terminal 200.

The user terminal 200 is a mobile terminal owned by the user of the vehicle 1. The user terminal 200 is configured to be able to execute the application program for executing the remote air conditioning of the vehicle. The application program outputs a user interface for setting an air conditioning parameter and acquires the content of the input made by the user. Further, based on the content of the input, the application program generates the air conditioning request for operating the air conditioning of the vehicle 1 and transmits the request to the center server 100. The air conditioning parameter is a set of parameters specified when the air conditioning device (including the car air conditioner) provided in the vehicle is operated.

The center server 100 and the user terminal 200 can be configured by a general-purpose computer. That is, the center server 100 and the user terminal 200 can be configured as a computer having a processor such as a CPU or a GPU, a main storage device such as a RAM or a ROM, an auxiliary storage device such as an EPROM, a hard disk drive, or a removable medium. An operating system (OS), various programs, various tables, and the like are stored in the auxiliary storage device. The programs stored in the auxiliary storage device are executed such that various functions can be implemented that match the predetermined purpose, which will be described later. However, some or all of the functions may be implemented by a hardware circuit such as an ASIC or an FPGA.

Figures 3, 4:
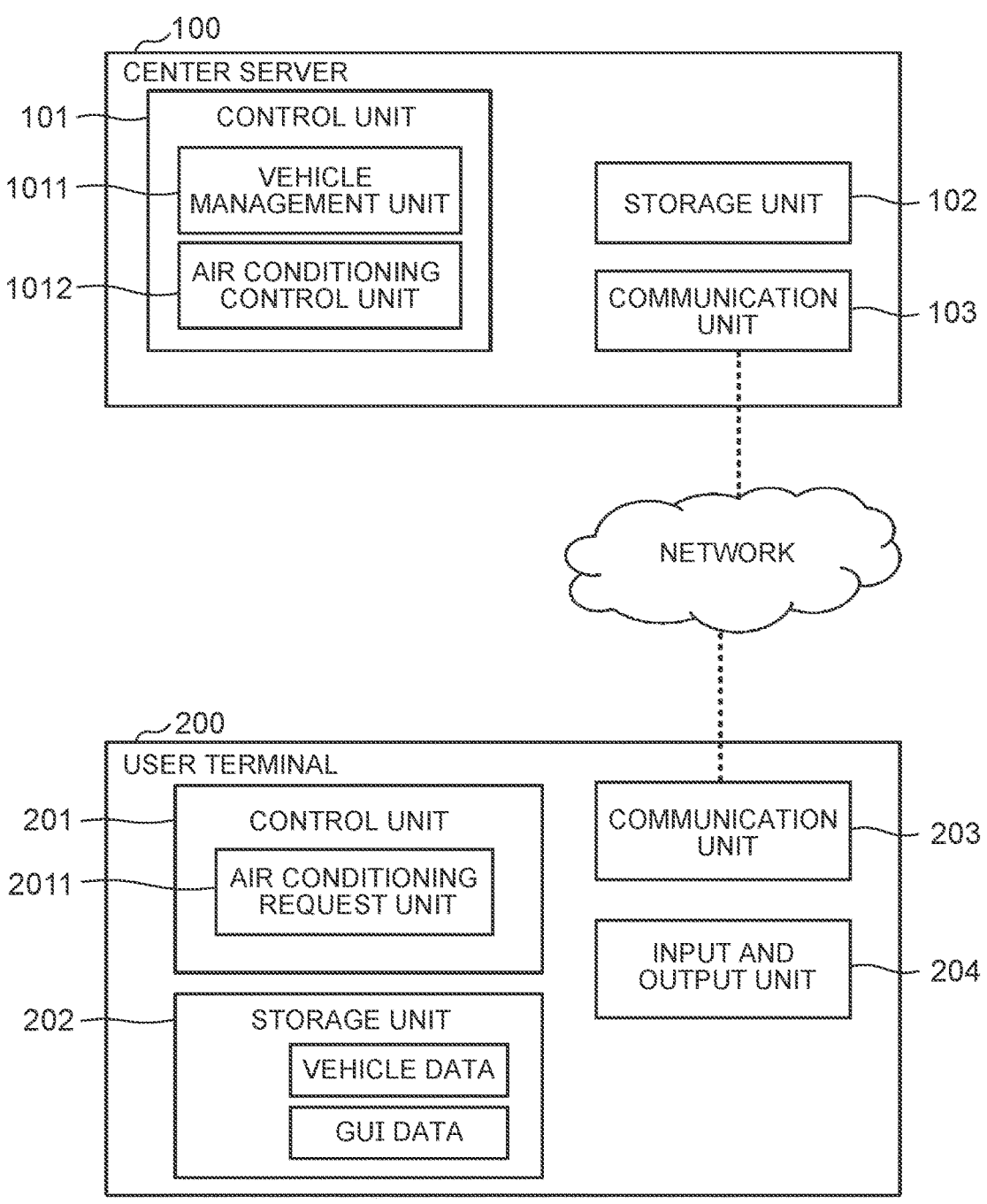
FIG. 3 is a block diagram showing components included in a center server and a user terminal.
FIG. 4 is a first example of an air conditioning parameter generated by the user terminal.

FIG. 3 is a block diagram schematically showing an example of the configurations of the center server 100 and the user terminal 200 shown in FIG. 1.

First, the center server 100 will be described. The center server 100 is configured to include a control unit 101, a storage unit 102, and a communication unit 103.

The control unit 101 is means for controlling the center server 100. The control unit 101 is composed of, for example, an information processing unit such as a CPU or a GPU. The control unit 101 includes a vehicle management unit 1011 and an air conditioning control unit 1012 as functional modules. Each functional module may be implemented by a program that is stored in storage means such as a ROM and executed by the CPU.

The vehicle management unit 1011 periodically communicates with the DCM 10 of the vehicle 1 under control and collects data related to the vehicle. The data related to the vehicle includes, for example, vehicle position information, vehicle speed information, information related to driving operations, and communication status. Further, the vehicle management unit 1011 has a definition of a communication protocol with the vehicle 1.

The air conditioning control unit 1012 identifies the vehicle (target vehicle) in which the air conditioning is operated based on the air conditioning request received from the user terminal 200, and transmits the air conditioning command to the DCM 10 mounted on the specified target vehicle via the network.

The storage unit 102 is means for storing information, and is composed of a storage medium such as a RAM, a magnetic disk, or a flash memory. The storage unit 102 stores various programs executed by the control unit 101, data used by the programs, and the like. Further, the storage unit 102 stores data related to the vehicle 1 (an identifier of the vehicle 1, identification information of the DCM 10, etc.).

The communication unit 103 is an interface for connecting the center server 100 to the network. The communication unit 103 can communicate with the vehicle 1 and the user terminal 200 via, for example, the Internet or a mobile communication network.

Next, the user terminal 200 will be described. The user terminal 200 includes a control unit 201, a storage unit 202, a communication unit 203, and an input and output unit 204.

The control unit 201 is means for controlling the user terminal 200. The control unit 101 is composed of, for example, an information processing unit such as a CPU or a GPU. The control unit 201 includes an air conditioning request unit 2011 as a functional module. Each functional module may be implemented by a program that is stored in storage means such as a ROM and executed by the CPU.

The air conditioning request unit 2011 generates a request for operating the air conditioning of the vehicle 1 (air conditioning request) based on the operation performed by the user, and transmits the request to the center server 100. The air conditioning request unit 2011 is realized by the above-mentioned application program. The air conditioning request unit 2011 generates a user interface screen using vehicle data and graphical user interface (GUI) data that will be described later, and provides the user with the user interface screen. Further, the air conditioning request unit 2011 acquires the information input via the user interface screen, and generates the air conditioning request based on the information. The details of the user interface will be described later.

The storage unit 202 is means for storing information, and is composed of a storage medium such as a RAM, a magnetic disk, or a flash memory. The storage unit 202 stores various programs executed by the control unit 201, data used by the programs, and the like. Further, the storage unit 202 stores data (vehicle data) related to the vehicle requesting air conditioning and design information (GUI data) for generating the user interface screen.

The communication unit 203 is an interface for connecting the user terminal 200 to a network (for example, the Internet and a mobile communication network). The communication unit 203 can communicate with the center server 100 using the same means as the communication unit 103.

The input and output unit 204 is means for receiving the input operation performed by the user and presenting information to the user. Specifically, the input and output unit 204 is composed of a touch panel and its control means, and a liquid crystal display and its control means. The touch panel and the liquid crystal display are composed of one touch panel display in the present embodiment. Further, the input and output unit 204 may have a speaker or the like for outputting audio.

Next, the details of the air conditioning parameter generated by the user terminal 200 and the user interface for generating the air conditioning parameter will be described. It is necessary to specify an air conditioning mode, a temperature (target room temperature), operating time, a device to be operated, and the like so as to operate the air conditioning of the vehicle. The information is called the air conditioning parameter. FIG. 4 is an example of the air conditioning parameter transmitted from the user terminal 200 to the center server 100. The air conditioning parameter includes a vehicle identifier, the air conditioning mode, temperature settings, a timer, information specifying the device to operate, and the like. The center server 100 generates a control command (air conditioning command) for the air conditioning ECU 20 of the vehicle 1 based on the received air conditioning parameter.

Figure 5:
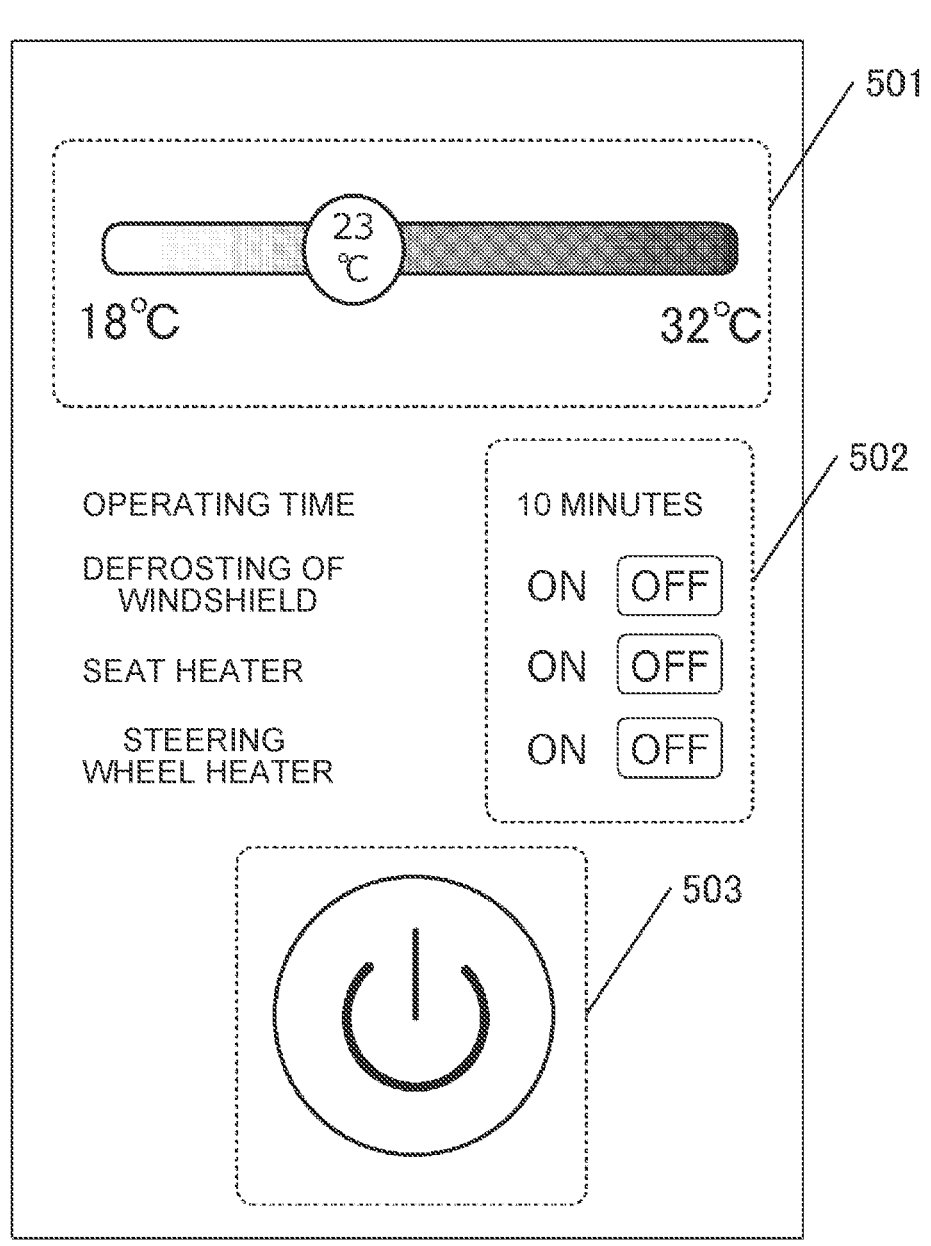
FIG. 5 is a first example of a user interface provided by the user terminal.

FIG. 5 is an example of the user interface for specifying the illustrated air conditioning parameter. The illustrated user interface includes a slider for setting the temperature (reference sign 501), a component for specifying the operating time and a device (reference sign 502), a button for transmitting a request (reference sign 503), and the like.

The example illustrated in FIG. 5 can be applied to a car air conditioner having a function of keeping the temperature inside a vehicle cabin at a target temperature. Such an air conditioner is also called an automatic air conditioner. However, in a car air conditioner that does not have a room temperature feedback function, the room temperature cannot be specified. Therefore, the illustrated user interface cannot be used. As such an air conditioner, for example, there is an air conditioner that adjusts the temperature by specifying a level of cooling and heating, instead of the room temperature. Such an air conditioner is also called an electronic manual air conditioner because manual setting is performed electronically. In the following description, the air conditioner having the room temperature feedback function will be referred to as a type 1 air conditioner, and the air conditioner having no room temperature feedback function will be referred to as a type 2 air conditioner. The user interface shown in FIG. 5 is a user interface compatible with the type 1 air conditioner.

Figures 6, 7, 8:
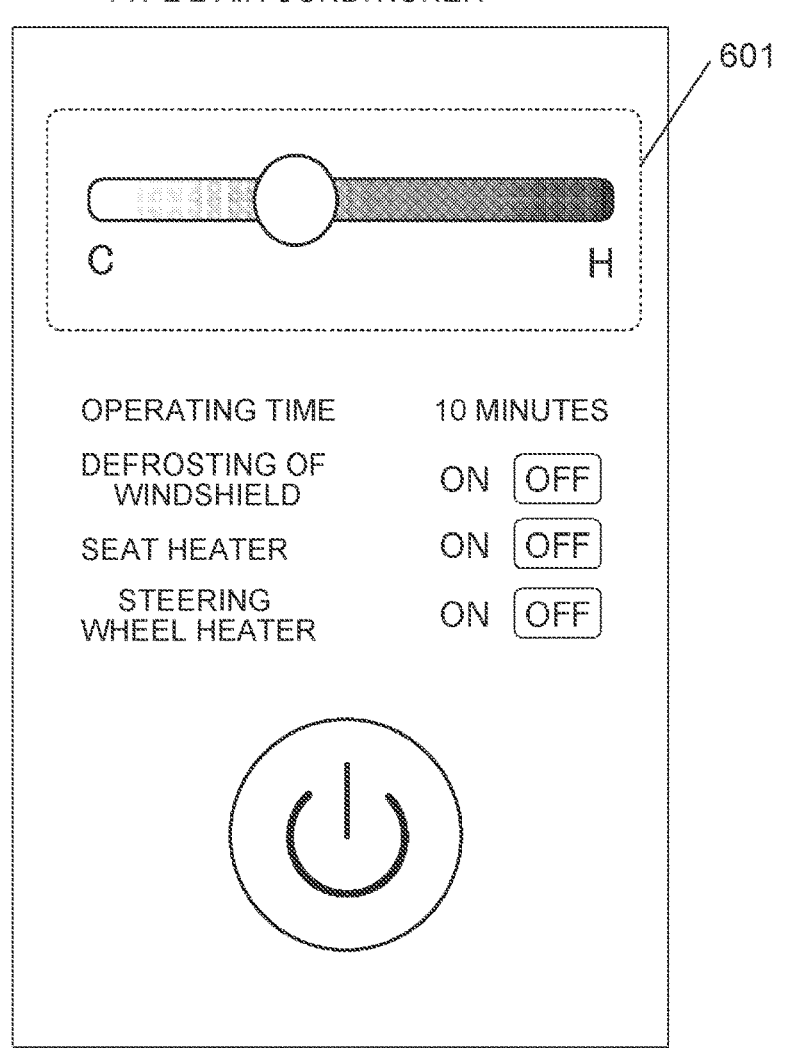
FIG. 6 is a second example of the user interface provided by the user terminal.
FIG. 7 is a second example of the air conditioning parameter generated by the user terminal.
FIG. 8 is an example of vehicle data stored in the user terminal.

When it is desired to control the air conditioning of a vehicle provided with the type 2 air conditioner, an interface for setting the target room temperature as indicated by the reference sign 501 cannot be used. FIG. 6 is an example of a user interface for specifying the air conditioning parameter for the vehicle provided with the type 2 air conditioner. The illustrated user interface includes a slider (references sign 601) for specifying the level of cooling and heating, instead of the slider for setting the temperature. FIG. 7 is an example of the air conditioning parameter generated using the user interface. The present example differs from the example shown in FIG. 4 in that the temperature setting field stores a numerical value representing the level.

As described above, the user terminal 200 according to the present embodiment is configured to be able to generate a plurality of user interfaces corresponding to a plurality of vehicle types having different types of air conditioners, and generates and outputs the user interface adapted for each target vehicle for which the remote air conditioning is performed.

The type of air conditioner included in the target vehicle for which the remote air conditioning is performed can be determined based on the vehicle data stored in the storage unit 202.

FIG. 8 is an example of the vehicle data stored in the storage unit 202. The vehicle data is data that associates the vehicle identifier with the type of air conditioner installed. The vehicle data is generated when the user terminal 200 is set up. The user terminal 200 (air conditioning request unit 2011) generates the user interface adapted for the target vehicle by referring to the stored vehicle data.

The user terminal 200 stores the GUI data in the storage unit 202. The GUI data is design information for generating the user interface, and the air conditioning request unit 2011 generates a user interface using the GUI data adapted for the type of air conditioner of the target vehicle.

As shown in FIG. 9A, the GUI data includes a plurality of data defined for each type of air conditioner. The air conditioning request unit 2011 selects the GUI data suitable for the type of air conditioner included in the target vehicle and generates the user interface. As shown in FIG. 9B, the GUI data may include data common to all air conditioners and differential data defined for each type of air conditioner. The differential data may be, for example, data that defines the component indicated by the reference sign 501 in FIG. 5 and the component indicated by reference sign 601 in FIG. 6. In this case, the air conditioning request unit 2011 applies a difference adapted for the type of air conditioner included in the target vehicle to the common data and generates the user interface.

Figure 10:
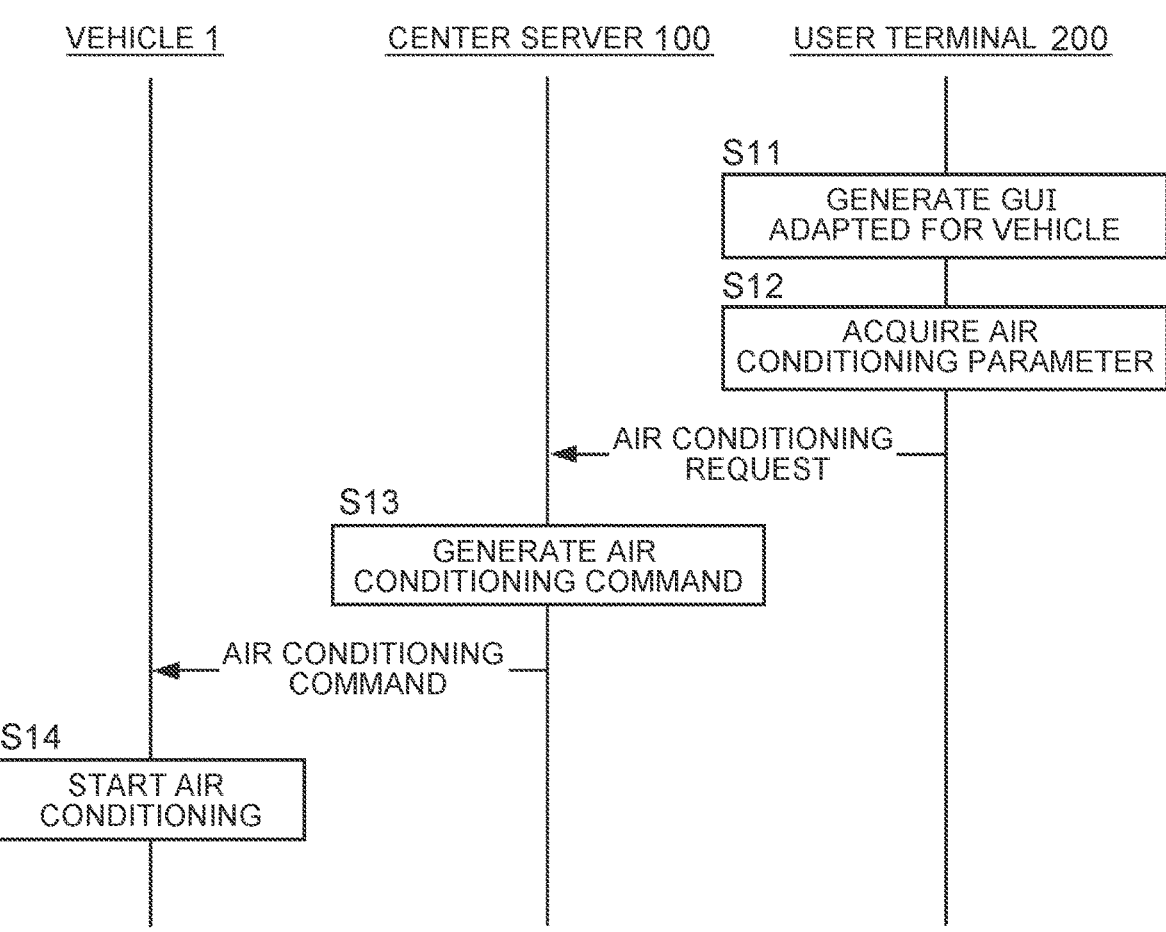
FIG. 10 is a flow diagram of data transmitted and received between components of the vehicle system.

FIG. 10 is a flowchart showing the flow of data between components included in the system. When the user who desires remote air conditioning of the vehicle activates application software on the user terminal 200, the user terminal 200 (air conditioning request unit 2011) generates the user interface adapted for the target vehicle (step S11).

Figure 11:
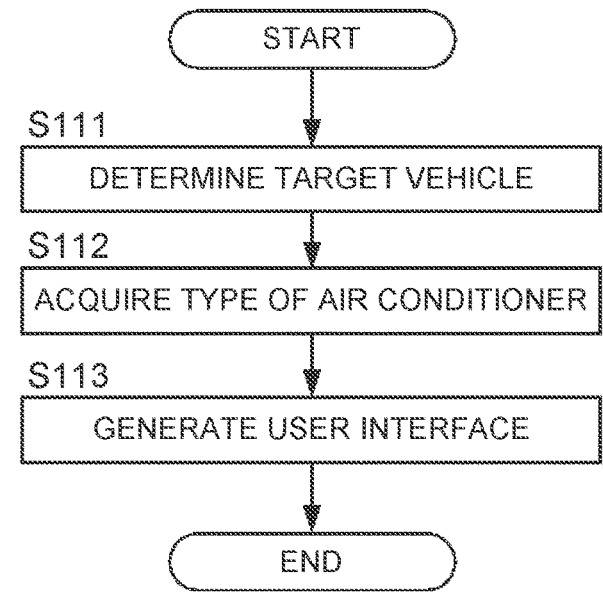
FIG. 11 is a flowchart of a process executed by a user terminal.

FIG. 11 is a flowchart showing the details of the process in step S11. First, in step S111, the target vehicle for which the remote air conditioning is performed is determined. When the data of only one vehicle is recorded in the vehicle data stored in the storage unit 202, the recorded vehicle is determined as the target vehicle. When the data for two or more vehicles is recorded in the vehicle data, the user is inquired about which vehicle to perform the remote air conditioning, and the selected vehicle is determined as the target vehicle.

Next, in step S112, the type of the air conditioner mounted on the target vehicle is acquired. The type of the air conditioner can be acquired by referring to the vehicle data stored in the storage unit 202. Next, in step S113, the user interface for generating the air conditioning parameter corresponding to the target vehicle is generated. As described above, the storage unit 202 stores the GUI data for each type of air conditioner, and the air conditioning request unit 2011 acquires the GUI data in accordance with the type of air conditioner of the target vehicle and generates the user interface.

In step S12, the air conditioning request unit 2011 acquires the air conditioning parameter specified by the user via the generated user interface, and transmits the air conditioning request including the air conditioning parameter to the center server 100.

In step S13, the center server 100 (air conditioning control unit 1012) receives the air conditioning request and generates the air conditioning command to be transmitted to the target vehicle. The format and transmission destination of the air conditioning command can be determined based on the data managed by the vehicle management unit 1011. The generated air conditioning command is transmitted to the DCM 10 provided in the target vehicle via the network.

In step S14, the DCM 10 provided in the target vehicle receives the air conditioning command and starts the remote air conditioning based on the air conditioning command. Specifically, the control device 11 provided in the DCM 10 transfers the received air conditioning command to the air conditioning ECU 20, and the control device 21 provided in the air conditioning ECU 20 operates various air conditioning devices in accordance with the air conditioning command. With this configuration, the air conditioner specified by the user operates in accordance with the specified parameters (temperature, mode, operating time, etc.). The air conditioning ECU 20 may stop the operation of the air conditioning device when the specified conditions (for example, room temperature, operating time, etc.) are satisfied.

As described above, in the vehicle system according to the present embodiment, the user terminal 200 stores the data related to the air conditioner mounted on the vehicle for which the remote air conditioning is performed, and provides a different user interface for each type of air conditioner. According to the embodiment above, the remote air conditioning for a plurality of vehicles having different types of air conditioners can be performed using the same application software.

Modification of First Embodiment

In the first embodiment, the user terminal 200 stores the type of air conditioner included in the vehicle and generates the user interface adapted for the target vehicle. However, the type of air conditioner mounted on the vehicle may be stored by the center server 100. For example, the user terminal 200 may transmit data (vehicle identifier, model name, etc.) for specifying the target vehicle to the center server 100, and the center server 100 may respond with the type of air conditioner mounted on the corresponding vehicle.

Further, in the first embodiment, the user terminal 200 communicates with the vehicle 1 via the center server 100. However, the user terminal 200 and the vehicle 1 may directly communicate with each other. In this case, the control unit 201 may be provided with the function of the control unit 101. Further, in the first embodiment, the user terminal 200 generates the user interface. However, the center server 100 may generate the user interface. That is, the user terminal 200 may function only as an input and output unit, and the center server 100 may have other functions.

Other Embodiments

The above-described embodiment is merely an example, and the present disclosure may be appropriately modified and implemented without departing from the scope thereof. For example, the processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiments, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc (CD)-read-only memory (ROM), digital versatile disc (DVD), Blu-ray disc, etc.), a ROM, a random access memory (RAM), an erasable programmable read only memory (EPROM), an electrically erasable programmable read only memory (EE-PROM), a magnetic card, a flash memory, an optical card, and any type of medium suitable for storing electronic commands.

What is claimed is:

1. An information processing method executed by a vehicle system including at least one processor configured to control an air conditioner of a vehicle remotely via a communication line, the method comprising:

acquiring vehicle data of one or more target vehicles configured to be remotely controlled for air conditioning;

based upon vehicle data of one target vehicle being acquired, selecting a user interface corresponding to a type of the air conditioner provided in the one target vehicle, from a plurality of different user interfaces, based on the vehicle data of the one target vehicle, the type of the air conditioner including a first type or a second type, the first type of the air conditioner having a temperature keeping function, the second type of the air conditioner not having the temperature keeping function, and the temperature keeping function being a function of keeping a temperature inside the vehicle at a target room temperature;

based upon vehicle data of two or more target vehicles being acquired:

inquiring a user to select one of the two or more target vehicles, determining the selected vehicle to be the target vehicle, selecting a user interface corresponding to a type of the air conditioner provided in the target vehicle from the plurality of different user interfaces, based on the vehicle data of the target vehicle that is selected by the user, the type of the air conditioner including the first type or the second type, the first type of the air conditioner having the temperature keeping function, the second type of the air conditioner not having the temperature keeping function, and the temperature keeping function being the function of keeping the temperature inside the vehicle at the target room temperature;

outputting the selected user interface;

acquiring a parameter related to air conditioning, the parameter being set via the output user interface; and issuing a control command for remotely controlling the air conditioner of the target vehicle based on the acquired parameter.

2. The information processing method according to claim 1, wherein, the selection of the user interface includes:

determining the type of the air conditioner provided in the target vehicle;

selecting a first user interface in response to the determination that the first type of the air conditioner is provided in the target vehicle, the first user interface including a numerical display of the target room temperature, and selecting a second user interface in response to the determination that the second type of the air conditioner is provided in the target vehicle, the second user interface being an interface in which the numerical display of the target room temperature is omitted from the first user interface.

3. The information processing method according to claim 1, wherein the user interface includes a slider for setting a temperature.

4. An information processing system configured to control an air conditioner of a vehicle remotely via a communication line, the information processing system comprising:

a mobile terminal including a first processor configured to acquire vehicle data of one or more target vehicles configured to be remotely controlled for air conditioning;

based upon vehicle data of one target vehicle being acquired, select a user interface corresponding to a type of the air conditioner provided in the one target vehicle, from a plurality of different user interfaces, based on the vehicle data of the one target vehicle, the type of the air conditioner including a first type or a second type, the first type of the air conditioner having a temperature keeping function, the second type of the air conditioner not having the temperature keeping function, and the temperature keeping function being a function of keeping a temperature inside the vehicle at a target room temperature, based upon vehicle data of two or more target vehicles being acquired:

inquire a user to select one of the two or more target vehicles, determine the selected vehicle to be the target vehicle, select a user interface corresponding to a type of the air conditioner provided in the target vehicle from the plurality of different user interfaces, based on the vehicle data of the target vehicle that is selected by the user, the type of the air conditioner including the first type or the second type, the first type of the air conditioner having the temperature keeping function, the second type of the air conditioner not having the temperature keeping function, and the temperature keeping function being the function of keeping the temperature inside the vehicle at the target room temperature;

output the selected user interface on a display of the mobile terminal, and acquire a parameter related to air conditioning set via the output user interface; and a server including a second processor configured to issue a control command for remotely controlling the air conditioner of the target vehicle based on the acquired parameter.

5. The information processing system according to claim 4, wherein the mobile terminal further includes a storage unit that stores the type of the air conditioner for each of a plurality of the vehicles having the air conditioner.

6. The information processing system according to claim 4, wherein the mobile terminal further includes a storage unit that stores a plurality of the user interfaces for each type of the air conditioner.

7. The information processing system according to claim 4, wherein the first processor is configured to:

determine the type of the air conditioner provided in the target vehicle, select a first user interface in response to the determination that the first type of the air conditioner is provided in the target vehicle, the first user interface including a numerical display of the target room temperature; and select a second user interface in response to the determination that the second type of the air conditioner is provided in the target vehicle, the second user interface being an interface in which the numerical display of the target room temperature is omitted from the first user interface.

8. The information processing system according to claim 4, wherein the user interface includes a slider for setting a temperature.

9. An information processing device configured to request control of an air conditioner of a vehicle remotely via a communication line, the information processing device comprising a first processor configured to:

acquire vehicle data of one or more target vehicles configured to be remotely controlled for air conditioning;

based upon vehicle data of one target vehicle being acquired, select a user interface corresponding to a type of the air conditioner provided in the one target vehicle, from a plurality of different user interfaces, based on the vehicle data of the one target vehicle, the type of the air conditioner including a first type or a second type, the first type of the air conditioner having a temperature keeping function, the second type of the air conditioner not having the temperature keeping function, and the temperature keeping function being a function of keeping a temperature inside the vehicle at a target room temperature;

based upon vehicle data of two or more target vehicles being acquired:

inquire a user to select one of the two or more target vehicles, determine the selected vehicle to be the target vehicle, select a user interface corresponding to a type of the air conditioner provided in the target vehicle from the plurality of different user interfaces, based on the vehicle data of the target vehicle that is selected by the user, the type of the air conditioner including the first type or the second type, the first type of the air conditioner having the temperature keeping function, the second type of the air conditioner not having the temperature keeping function, and the temperature keeping function being the function of keeping the temperature inside the vehicle at the target room temperature;

output the selected user interface;

acquire a parameter related to air conditioning, the parameter being set via the output user interface; and transmit the acquired parameter to a server device including a second processor configured to remotely manage the target vehicle.

10. The information processing device according to claim 9, further comprising a storage unit that stores the type of the air conditioner for each of a plurality of the vehicles having the air conditioner.

11. The information processing device according to claim 9, further comprising a storage unit that stores a plurality of the user interfaces for each type of the air conditioner.

12. An information processing method executed by an information processing device including at least one processor configured to request control of an air conditioner of a vehicle remotely via a communication line, the method comprising:

acquiring vehicle data of one or more target vehicles configured to be remotely controlled for air conditioning;

based upon vehicle data of one target vehicle being acquired, selecting a user interface corresponding to a type of the air conditioner provided in the one target vehicle, from a plurality of different user interfaces, based on the vehicle data of the one target vehicle, the type of the air conditioner including a first type or a second type, the first type of the air conditioner having a temperature keeping function, the second type of the air conditioner not having the temperature keeping function, and the temperature keeping function being a function of keeping a temperature inside the vehicle at a target room temperature;

based upon vehicle data of two or more target vehicles being acquired:

inquiring a user to select one of the two or more target vehicles, determining the selected vehicle to be the target vehicle, selecting a user interface corresponding to a type of the air conditioner provided in the target vehicle from the plurality of different user interfaces, based on the vehicle data of the target vehicle that is selected by the user, the type of the air conditioner including the first type or the second type, the first type of the air conditioner having the temperature keeping function, the second type of the air conditioner not having the temperature keeping function, and the temperature keeping function being the function of keeping the temperature inside the vehicle at the target room temperature;

outputting the selected user interface;

acquiring a parameter related to air conditioning, the parameter being set via the output user interface; and transmitting the acquired parameter to a server device including a processor configured to remotely manage the target vehicle.

13. A non-transitory storage medium storing a program for causing a computer to execute the information processing method according to claim 12.

14. The information processing method according to claim 1, wherein the vehicle data includes a correspondence between the one or more target vehicles and the type of air conditioning installed in each of the one or more target vehicles.

15. The information processing method according to claim 1, wherein a number of components displaying a numerical value of temperature in the user interface corresponding to the first type of air conditioner is greater than the number of components displaying the numerical value of temperature in the user interface corresponding to the second type of air conditioner.

16. The information processing method according to claim 1, wherein the user interface corresponding to the first type of air conditioner includes a user interface common to a plurality of types of air conditioners including the first type and the second type and a component for only the first type, wherein the user interface corresponding to the second type of air conditioner includes the user interface common to the plurality of types of air conditioners and a component for only the second type.

17. The information processing method according to claim 1, wherein the plurality of different user interfaces are provided in a single application program executed by the at least one processor for performing remote air conditioning of the one or more target vehicles.

18. The information processing system according to claim 4, wherein the plurality of different user interfaces are provided in a single application program executed by the first processor for performing remote air conditioning of the one or more target vehicles.

19. The information processing device according to claim 9, wherein the plurality of different user interfaces are provided in a single application program executed by the first processor for performing remote air conditioning of the one or more target vehicles.

20. The information processing method according to claim 12, wherein the plurality of different user interfaces are provided in a single application program executed by the at least one processor for performing remote air conditioning of the one or more target vehicles.

\* \* \* \* \*